United States Patent [19]
Blackwell

[11] 3,784,905
[45] Jan. 8, 1974

[54] APPARATUS FOR DETERMINATION OF THE DENSITY OF IN-PLACE MATERIALS BY MEASUREMENT OF THEIR DIELECTRIC STRENGTH

[75] Inventor: Lyman L. Blackwell, Denver, Colo.

[73] Assignee: Soiltest, Inc., Evanston, Ill.

[22] Filed: Nov. 29, 1972

[21] Appl. No.: 310,588

Related U.S. Application Data

[63] Continuation-in-part of Ser. No. 110,074, Jan. 27, 1971, abandoned.

[52] U.S. Cl. .......................................... 324/61 QS
[51] Int. Cl. ............................................ G01r 27/26
[58] Field of Search ...................... 324/61, 61 QS; 73/73; 317/246

[56] References Cited
UNITED STATES PATENTS
1,984,166  12/1934  Walter .............................. 324/61 X
2,782,367  2/1957  Dallas ................................. 324/61
3,400,331  9/1968  Harris ................................. 324/61
3,519,922  7/1970  Nash et al. .......................... 324/61

*Primary Examiner*—Stanley T. Krawczewicz
*Attorney*—Gomer W. Walters

[57] ABSTRACT

An apparatus for measuring the dielectric properties of materials to thereby determine density, weight per unit of volume, thickness or the like. A special application is shown to determine the thickness, weight, roughness and density of bituminous pavement. The instrument includes a plurality of runners, some of which are vertically displaced relative to the others to form a capacitor in a tuned circuit. The instrument is slowly drawn across the surface of the material to be tested and variations in the detuning of the circuit are amplified and recorded whereby the density, thickness or the like can be instantly determined.

3 Claims, 9 Drawing Figures

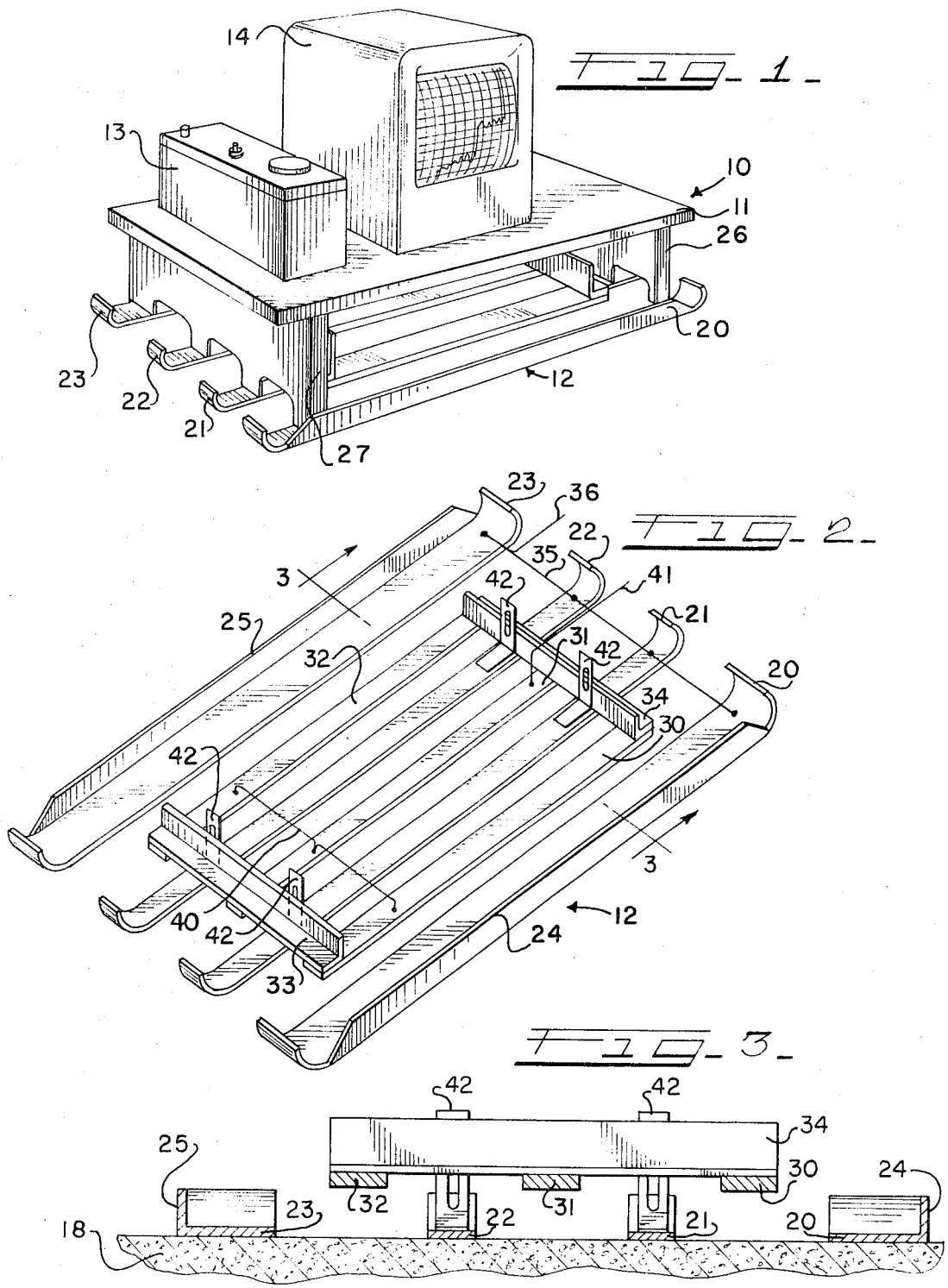

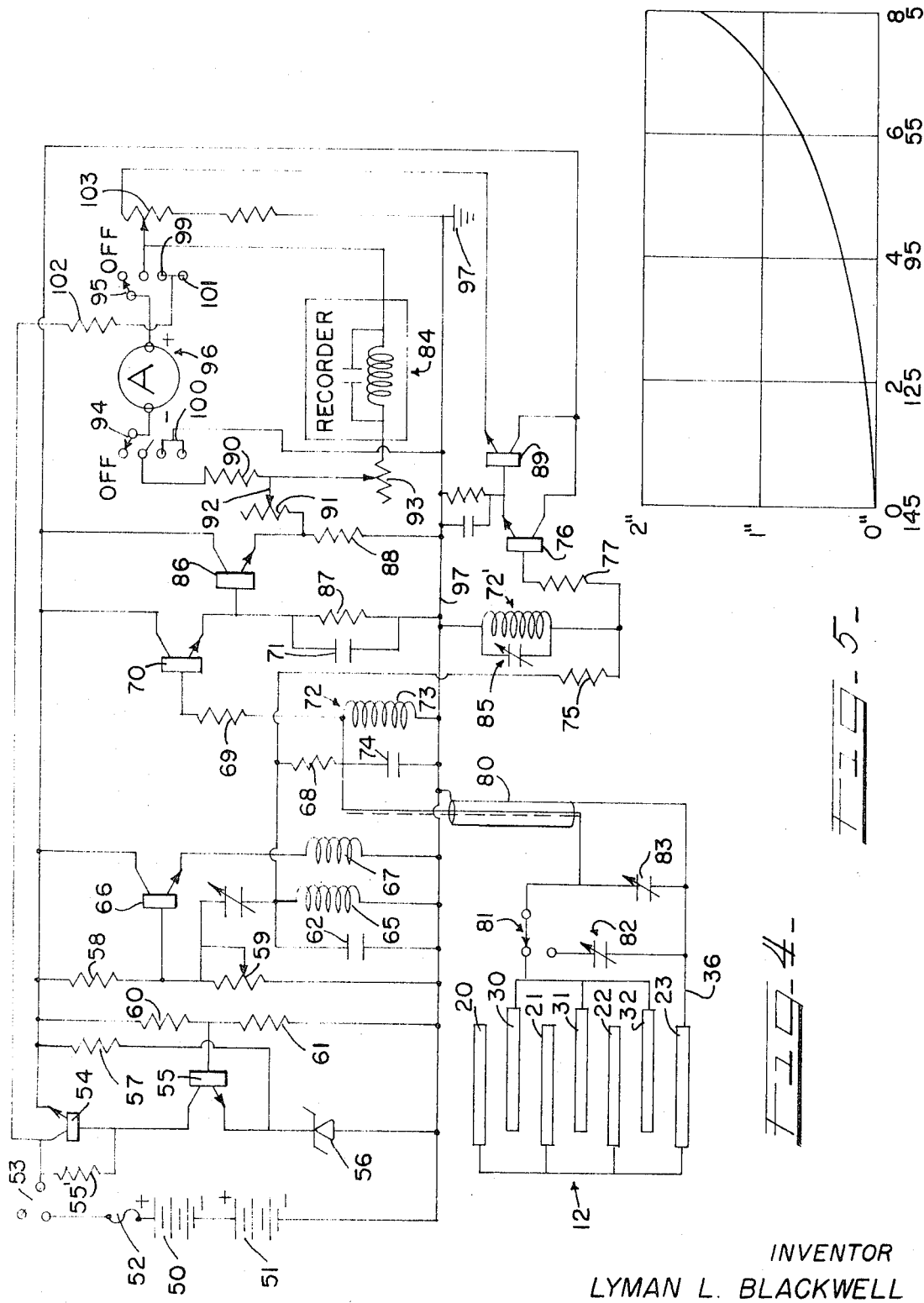

INVENTOR
LYMAN L. BLACKWELL
BY Robert E. Wagner
ATT'Y.

3,784,905

APPARATUS FOR DETERMINATION OF THE DENSITY OF IN-PLACE MATERIALS BY MEASUREMENT OF THEIR DIELECTRIC STRENGTH

This is a continuation-in-part of U.S. Ser. No. 110,074, filed Jan. 27, 1971, now abandoned, by Lyman L. Blackwell and entitled "Apparatus for Measuring the Dielectric Properties of Materials."

This invention relates to improvements in an apparatus or instrument for measuring the properties of materials in general, and more specifically, is directed to a new and improved apparatus to determine the dielectric properties of materials, particularly those properties which affect the dielectric strength such as density, weight, thickness or changes in chemical composition.

The present invention will be explained with specific reference to an instrument for determining the density in surfacing materials such as asphalt, concrete or the like, however, the principles are generally applicable to a wide range of materials and such limited description is intended only for ease of explaining the construction and operation of the device. Other applications of the instrument will become apparent to those skilled in the art.

The present invention is directed to a novel arrangement of detecting electrodes which provides a vertical spacing between the electrodes while positioned in interfitted, non-contacting relationship. The electrical field radiates between the two electrode sets and the displacement distance determines the depth of penetration of the alternating current field, thereby affecting the sensitivity of the sensing means and determining the linearity of the response of the sensor to the particular parameter under test. Means is provided to detune the circuit to the side of the peak of resonance whereby an increase in the capacitance causes a decrease in voltage across the resonant circuit, as dielectric losses in the material under test also serve to cause some drop in voltage. The alternating current voltage across the resonant circuit is then rectified to a direct current voltage of low impedance which drives a recorder and/or meter movement to permit a continuous and readily visible record of the material undergoing test.

The present instrument permits the obtaining of average density readings, thereby permitting a better overall determination of pavement quality than was previously obtained by spot measurements with mechanical and nuclear density testers of known type. With the instrument of the present invention, the relative change in density is easily determined and thereby provides a better indication of over-all pavement quality than a few absolute density spot measurements. In spite of the improved results and ease of use, the present instrument obtains accuracy heretofore only found in nuclear instruments with far less expense.

The present instrument consists of basic components such as electrodes formed in the shape of runners which are attached to a base supporting the electronic circuitry and recording means. Suitable means such as nylon cord or similar hitch may be used to pull or tow the self-contained instrument across the selected portion of the material or pavement to be tested. The chart made during the traverse may be reviewed at a later time or immediately, depending upon the particular need of the user. Spot checks may also be made to determine if further paving, rolling or the like is required.

It is an object of this invention to provide a new and improved instrument for the measurement of dielectric properties of materials such as bituminous pavement and the like.

It is a further object of this invention to provide a new and improved instrument for the measurement of the dielectric properties of materials, which instrument is capable of economical manufacture and will be rugged enough to withstand use in the field yet be sufficiently sensitive to perform the sensitive measurements required.

It is a still further object of this invention to provide a novel instrument for measuring the dielectric properties of materials which is self-contained and simple to operate, enabling use without extensive formal instruction.

Objects in addition to those specifically set forth will become apparent upon reference to the accompanying drawings wherein:

FIG. 1 is a perspective view of the instrument of the present invention;

FIG. 2 is a perspective view of the runners which form the measuring electrodes;

FIG. 3 is a cross-sectional view taken generally along line 3—3 of FIG. 2 to illustrate the vertical displacement between the electrodes;

FIG. 4 is a schematic diagram of the sensing and recording circuit associated with the electrodes;

FIG. 5 is a calibration graph which plots the distance of the plates above the bituminous pavement mix against the capacitance change in microfarads to thereby indicate the density of the mix;

Figure 6:
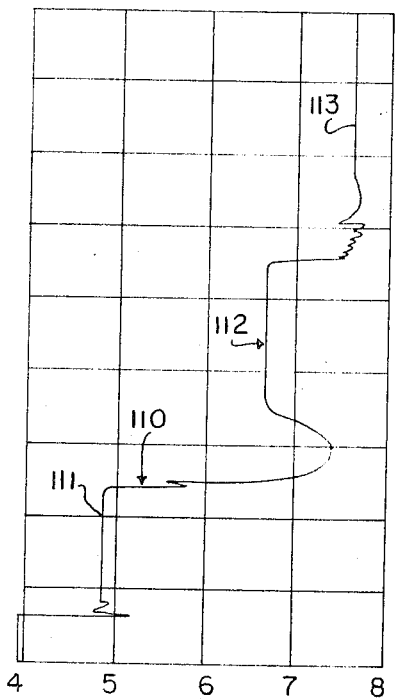
FIG. 6 is a reproduction of a strip of a recording which generally illustrates the recorded output as the instrument is pulled from across bituminous pavement samples having densities ranging from 146 pounds per cubic foot to 118 pounds per cubic foot.

Referring now to FIG. 1, reference character 10 illustrates the apparatus for measuring the dielectric property of materials and consists generally of a base member 11 mounted on an electrode assembly indicated generally at 12. The base 11 supports a battery and circuit box 13 and a recorder 14 of a known type.

Referring now to FIG. 2, the electrode assembly 12 consists of a plurality of spaced runners 20, 21, 22 and 23 which form the material-engaging electrodes. The runners 20 and 23 are provided with upstanding flanges 24 and 25 which form mounting areas for attachment to the vertical supports 26 and 27 on the housing 11 (FIG. 1). The runners 21–23 are provided with upturned or curled ends in the fashion of a sled or skid to permit the instrument 10 to be towed or pulled across the surface of the material to be tested. Interfitted between the material-engaging electrodes 20–23 are vertically displaced electrodes 30, 31 and 32 which are joined together in spaced relation on opposite ends by non-conducting angle members 33 and 34. The runners 20–23 are electrically connected as indicated schematically by a connection 35 to form one set of capacitor plates having a lead 36 for joining them into the measuring circuit. In a similar manner, plates 30, 31 and 32 are electrically connected through a bus bar or wire 40 with a lead 41 for use in joining them into the measuring circuit. Each of the angle members 33 and 34 is provided with a pair of upstanding flanges 42 which facilitate attachment to the housing 11 to hold the electrodes 30–32 vertically elevated relative to the runners 20–23. In one commercial form, the electrodes 20–23 were about 22 inches long and 2 inches wide with the electrodes 30–32 the same length but only 1 inch wide.

Referring now to FIG. 3, the relative degree of elevation of the electrodes may be observed. Electrodes 20–23 are located in a common plane for direct contact with the surface of the material to be tested, such as a bituminous pavement or the like. The center electrodes 30–32 are disposed in a common plane in interfitted, spaced, non-contacting relation to the electrodes 20–23, being vertically spaced relative to the plane of the electrodes 20–23. The fixed distance electrodes 30–32 are placed away from the material under test generally determines the depth of penetration of the alternating current field, affects the sensitivity of the sensor and determines the linearity of the response of the sensor to the parameter under test. By way of example, it has been found, in bituminous pavement, that the optimum vertical displacement of electrodes 30–32 with respect to electrodes 20–23 and the material surface is one-quarter inch or more in order to have the electric field generated between these two electrodes penetrate into the material under test so that accurate measurement of the density of the material at a depth below the surface is thereby obtained.

Figure 8:
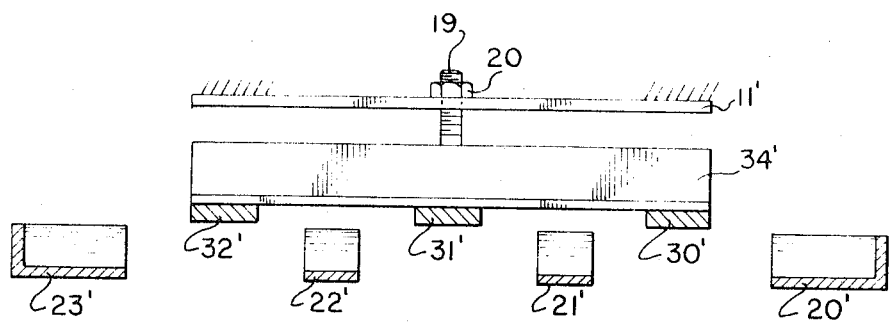
FIG. 8 is a cross-sectional view of an electrode arrangement similar to FIG. 2, however, in which the center electrodes are vertically adjustable; and, FIG. 9 is a fragmentary cross-sectional view of the left-hand portion of the sled or runner arrangement of FIG. 2 with a fixed non-conducting spacer means on the vertically-displaced electrode.

In the modified form of electrode arrangement shown in FIG. 8, prime numerals are utilized to indicate components which are similar to those in the electrode arrangement shown in FIG. 3. In FIG. 8, the center set of electrodes are mounted for vertical adjustment which is shown schematically by a threaded member 19 and nut 20. While a single threaded member is illustrated, it is contamplated that any support which will maintain the electrodes 30'–32' in coplanar relationship for vertical adjustment may be utilized. A micrometer thread adjustment is used which permits the vertical displacement of the electrodes 30'–32' to be varied in the field.

Referring now to FIG. 4, the electrodes or detector plates are schematically illustrated in their electrical relationship with the circuit which detects, amplifies and records the dielectric changes. The circuit is self-contained, being provided with a pair of 6-volt batteries indicated schematically at 50 and 51 wired in series through a fuse 52. An off-on switch is provided at 53 for manually de-energizing the circuit when not in use.

Solid state components are used for minimizing power requirements. A pair of NPN silicon transistors 54 and 55 have the respective base and collector joined in the manner shown with the transistor 54 having its emitter connected in parallel with a 1.2K ohm resistor 55' shunting the collector and base. A zener diode 56 completes the circuit to the negative side of the battery. A 390 ohm resistor 57 is provided in series with the zener diode 56.

A base of the transistor 55 is connected through a 1.2K ohm resistor 60 to the emitter of the transistor 54 and the base of the transistor 55 is also connected through a 5.6K ohm resistor 61 to the negative side of the battery. These components form a voltage regulator which provides a regulated D.C. voltage 64.

An LC circuit formed by an 82 micromicrofarad capacitor 62 and a 20 millihenry inductance 65 is joined through a 10 micromicrofarad trimmer capacitor 63 to the base of the transistor 66. The emitter of the transistor 66 is connected through a coil 67 which is inductively coupled to coil 65. Both coils 65 and 67 are connected to ground 97. The collector of the transistor 66 is connected to the regulated D.C. supply voltage 64 and the base of transistor 66 is biased on by means of resistor 58 and potentiometer 59. These components form an oscillator for supplying a 100 KC alternating voltage source.

A detecting resonance circuit 72 is formed by the 100 micromicrofarad capacitor 74 and the 20 millihenry inductor 73. The detecting resonance circuit is connected to the oscillator through resistor 68. The electrode assembly 12 is connected through cable 80 to the detecting resonance circuit. A switch 81 permits the electrode assembly to be taken out of the detecting circuit to compare or calibrate to a standard variable capacitor 82 and trimmer capacitor 83.

An increase in the dielectric as measured by electrode 12 produces an increase in the capacitance of the resonance circuit causing a decrease in the A-C voltage across the resonance circuit 72. This decrease is produced by detuning the LC 72 circuit to one side of resonance.

A NPN transistor 70 is connected through resistor 69 to the resonance circuit 72. The emitter of the transistor 70 is connected to the negative side of battery 51 and chassis ground 97 through resistor 87 and capacitor 71. The base-emitter diode junction of transistor 70 rectifies the A-C voltage across the resonance circuit 72 and results in a variance of the emitter collector current of 70 to vary directly with the resonance circuit voltage. The base of transistor 86 is connected to the emitter of 70 to further amplify the output of 70 to drive recorder 84 and meter 96.

The emitter of the transistor 86 is joined to a 1K ohm resistor 88 and a variable resistor 91 having a slide 92 for variation of the resistance from 0–100 ohms. The slide 92 is connected through a variable resistor 93 to the circuit in the recorder 84. The controls 92 and 93 serve to balance the meter and recorder. A calibration resistance 90 of 370 ohms is wired in series with switches 94 and 95 which are serially arranged with an ammeter or output meter 96. As illustrated, the switches are in the off position with the intermediate position being operate. Movement to the terminals 100 and 101 facilitates a battery check by placing the ammeter directly across the batteries with a 12K ohm resistor 102 in series therewith. This permits the condition of the batteries to be determined each time the instrument is used. In the operate position, a 2K ohm potentiometer 103 is connected to the positive output of the meter 96 through contact 99 of switch 95. The voltage developed across 103 is used as a reference to zero or to balance the meter 96. This reference voltage is supplied from transistor 89, the base of which is connected to the emitter of the transistor 76. The base of transistor 76 is connected through resistor 77 to the resonance circuit 72'. Resonance circuit 72' is coupled to the oscillator through resistor 75 and is detuned in a manner identical to resonance circuit 72. Resonance circuit 72' is resonated by capacitor 85 and therefore provides a reference voltage that compensates for variations in circuit parameter making the instrument stable to all changes but those resulting from changes in detecting electrode 12.

As is evident from the above description, while being sufficiently sensitive to measure the changes in the dielectric strength of the material caused by the changes in density of the material undergoing test, the circuit is still sufficiently simple to permit its construction at a relatively low cost. In the preferred form of the invention, printed circuits or the like are used to further reduce the cost of manufacture. Also in the preferred embodiment, the detector plates 20-23 and 30-32 are made of aluminum which is lightweight, has good conductance and is resistant to corrosion.

In order to utilize the present invention and obtain consistent and reliable readings, the capacitor plates or electrodes 20-23 must lie in a common plane whereby they will be flush with the surface to be tested. Also, where the material is asphalt paving, it must contain 4 percent or more asphalt and be void of small rocks, sand or moisture on the surface. To demonstrate the effect that depth has on the testing device, the graph in FIG. 5 illustrates a plot of the changes in the meter as the electrode plates are lifted above a sample of 6 percent asphalt mix which has been compacted to 145 pounds per cubic foot. Below, the capacitance change in microfarads is plotted density in cubic feet which would conform to the capacitance change for the relative densities indicated.

In FIG. 6 is illustrated a typical recorder strip showing the measured output from the instrument of the present invention as it was pulled across a bituminous pavement composed of samples having densities of 146 pounds per cubic foot, 127 pounds per cubic foot and 118 pounds per cubic foot. The numerals at the base of the recorder strip indicate the readings on the dielectric gauge with the trace indicated generally at 110. The plateau 111 is the curve traced while the instrument was drawn over pavement having a density of 146 pounds per cubic foot. The sharp drop to 127 pounds per cubic foot is shown at 112, demonstrating that the instrument was pulled to the less dense pavement. The plateau 113 on the curve 110 was traced as the instrument moved across a pavement sample having a density of 118 pounds per cubic foot. It is readily evident that any appreciable change in pavement density will become immediately detectable to the operator by merely scanning the recorder strip which also provides a permanent record of the test. On the site, readings can be determined at any location by directly reading the meter. This will serve to guide paving contractors in meeting specifications while on the site.

Figure 7:
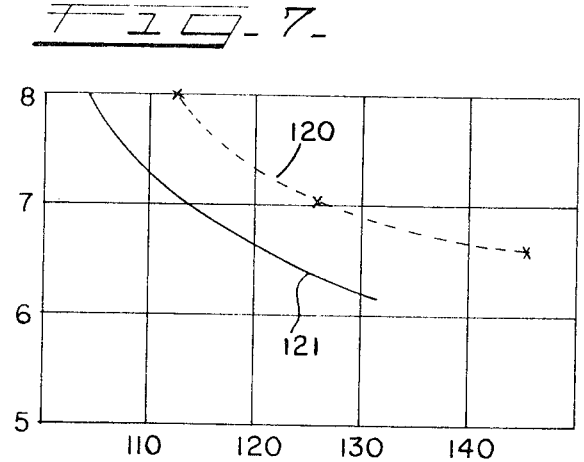
FIG. 7 is a graph which plots dielectric meter reading in micro-microfarads against the density in pounds per cubic foot with a sand aggregate mix shown in solid lines and coarse aggregate mix in dashed lines.

In FIG. 7, a graph plotted from a comparison of the meter reading against the density in pounds per cubic foot of two types of asphalt is illustrated. The curve indicated in dotted lines at 120 is the curve generated by tests made on an experimental strip of 6 percent asphalt having a coarse aggregate. The curve 121 is the plot obtained from readings developed as the instrument was pulled across a 6 percent asphalt mix containing sand and varying in density from 105 pounds per cubic foot to 128 pounds per cubic foot.

Figure 9:
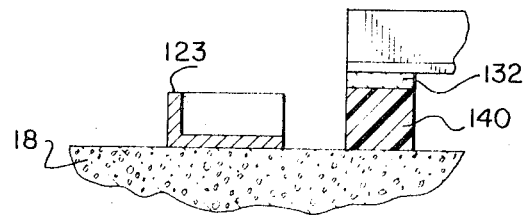

Referring now to FIG. 9, a fragmentary cross-sectional view of a modified form of electrode assembly is shown, being the left-hand portion of the electrode. It is contemplated that the fixed electrode 123 will take the form of the electrodes 23 and 23' while the vertically displaced electrode 132 will be identical to the electrodes 32 and 32' with a constant spacing means 140 disposed beneath the capacitor plate 132 to provide for constant spacing and pressure between the asphalt mat and capacitor plates 123 and 132. As is evident, the remainder of the electrode assembly shown in FIG. 9 is of the same form as that illustrated in FIGS. 2 and 3 with each of the respective plates 30, 31 and 32 being provided with a spacing means of the type shown at 140. While certain advantages are achieved by the addition of the spacer, it does reduce the sensitivity of the device.

In operation, the instrument is placed on the pavement which must have been rolled at least once. Care should be exercised to assure that no fine stones or water remain on the freshly-laid pavement. The operator moves the instrument across the pavement at 1 to 2 mph with a recording of the readings made for approximately every ten-foot strip. The electrical field radiating from the two sets of electrodes with the fixed vertical distance between them determines the depth of penetration of the alternating current field. This, in turn, affects the sensitivity of the sensing circuit and determines the linearity of the response of the sensing circuit to the test material. When material density is high, the dielectric constant on the loss and capacitance resonant circuit is relatively high and the ammeter will show a higher output, thus indicating a higher or more dense material. When material density is low, then the output of the loss and capacitance circuit is lower and the ammeter illustrates accordingly. Throughout the test, the capacitor plates 20-23 are in direct contact with the asphalt while the capacitor plates 30-32 are disposed a fixed distance above the plates 20-23.

In an electrode assembly of the type shown in FIG. 8, the movable electrode assembly may be adjusted vertically to obtain maximum response and minimize edge effect. Also, the depth of penetration of the sensing field can be controlled to limit it to no more than the depth of the material undergoing test. This form of the invention would have specific application where the material is applied in layers of differing densities, resurfacing or the like.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. A portable, non-destructive testing apparatus for determining the density of an in-place material by moving the apparatus across the surface of a material and measuring variations in the dielectric strength of the material, including first electrode means and second electrode means positioned on the same side of the surface of said material and radiating an electrical field therebetween, said first and second electrode means forming a sensing capacitor means, said first electrode means being disposed in intimate contact with the surface of said material, said second electrode means being interfitted with said first electrode means but being vertically upwardly displaced a selected distance relative to said surface of said material and alternately spaced between said first electrode means to assure proper penetration of the electric field into said material and to minimize edge effects, first inductance means in electrical communication with said sensing capacitor means to form a detecting resonance circuit to measure changes in the dielectric strength of said material as said apparatus is moved across its surface, reference resonance circuit means having a fixed capacitor means to provide a reference voltage for comparison to the voltage produced by said detecting resonance circuit, oscillator means in electrical communication with each of said detecting resonance circuit and said reference resonance circuit, each of said resonance circuits being detuned to that side of resonance whereby increases in the capacitance of the sensing capacitor means will cause a decrease in the voltage across said detecting resonance circuit means which decrease may be electrically transferred through and transformed by voltage converter means to drive indicating means such as a meter, chart recorder or the like to produce a quick, accurate indication of the density of said material below its surface.

2. The testing apparatus set forth in claim 1 wherein said vertically displaced second electrode means are provided with non-conductive spacer means disposed between said second electrode means and said surface of said material to assure constant spacing and pressure between said surface and said electrode means.

3. A portable, non-destructive testing apparatus for determining the density of in-place materials such as bituminous pavement by moving the apparatus across the surface of the material and measuring variations in the dielectric strength of the material, including first electrode means and second electrode means positioned on the same side of the surface of said material and radiating an electrical field therebetween, said first and second electrode means forming a sensing capacitor means, said first electrode means being disposed in intimate contact with the surface of said material, said second electrode means being interfitted with said first electrode means but being vertically upwardly displaced a distance of at least one-fourth inch relative to said surface of said material and alternately spaced between said first electrode means to assure proper penetration of the electric field into said material and to minimize edge effects, first inductance means in electrical communication with said sensing capacitor means to form a detecting resonance circuit to measure changes in the dielectric strength of said material as said apparatus is moved across the surface, reference resonance circuit means having a fixed capacitor means to provide a reference voltage for comparison to the voltage produced by said detecting resonance circuit means, oscillator means in electrical communication with each of said detecting resonance circuit and said reference resonance circuit, each of said resonance circuits being detuned to that side of resonance whereby increases in the capacitance of the sensing capacitor means will cause a decrease in the voltage across said detecting resonance circuit which decrease may be electrically transferred through and transformed by voltage converter means to drive indicating means such as a meter, chart recorder or the like to produce a quick, accurate indication of the density of said material below its surface.

* * * * *